United States Patent [19]

Kinsley et al.

[11] Patent Number: 4,679,369
[45] Date of Patent: Jul. 14, 1987

[54] ANCHORING SYSTEM

[75] Inventors: Ann M. Kinsley, Havertown; William A. Mansi, Yeadon, both of Pa.

[73] Assignee: Wickes Manufacturing Company, Southfield, Mich.

[21] Appl. No.: 712,581

[22] Filed: Mar. 15, 1985

[51] Int. Cl.⁴ .............................. B64F 1/16; B64F 1/02
[52] U.S. Cl. ................................... 52/155; 244/110 C
[58] Field of Search ............... 244/110 C, 110 F, 114, 244/115; 52/146, 152, 153, 155, 156, 158, 166

[56] References Cited

U.S. PATENT DOCUMENTS

| 579,918 | 3/1892 | Davis | 52/155 |
| 729,591 | 6/1903 | Jacob | |
| 831,714 | 9/1906 | Follett | 52/146 |
| 911,504 | 2/1909 | Jay | 52/156 |
| 1,320,081 | 8/1919 | Martin | 52/155 |
| 4,342,179 | 8/1982 | Hill | 52/155 |
| 4,429,849 | 2/1984 | Maier | 248/156 |

FOREIGN PATENT DOCUMENTS

| 23818 | 6/1918 | Denmark. | |
| 23746 | 11/1918 | Denmark | 52/155 |
| 2202131 | 7/1973 | Fed. Rep. of Germany. | |
| 572980 | 2/1958 | Italy | 52/155 |
| 610912 | 6/1978 | U.S.S.R. | 52/155 |

Primary Examiner—Galen Barefoot
Attorney, Agent, or Firm—William J. Spatz

[57] ABSTRACT

A multiple stake anchoring system for portable aircraft arresting gear including a stake guide for directing a first stake into the ground at a predetermined angle, a stake driven into the ground through the stake guide, a spacer collar mounted on the stake guide by sliding over the top of the stake, and a rigid elongated stake tie having parallel cylindrical passages through each of its ends mounted on the spacer collar by sliding one passage thereof over the stake. A second stake is driven into the ground through the cylindrical passage in the distal end of the stake tie. The second stake is rigidly connected to the first stake by the stake tie and has the same angle of inclination with respect to the plane of the ground because the two cylindrical passages through the stake tie are parallel. Additional stakes are added to the anchor system by mounting an additional collar and stake tie on the last installed stake and then driving an additional stake through the distal cylindrical passage in the additional stake tie.

7 Claims, 3 Drawing Figures

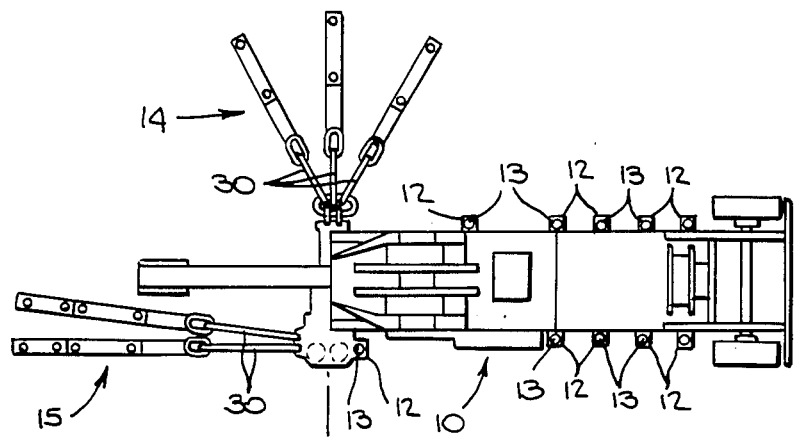
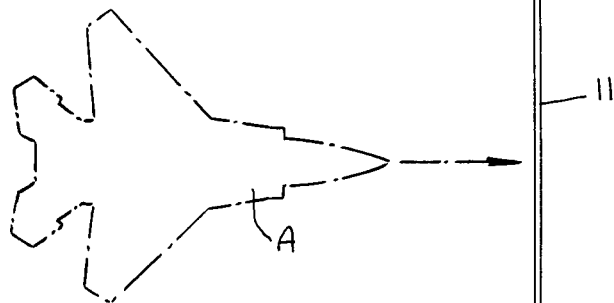
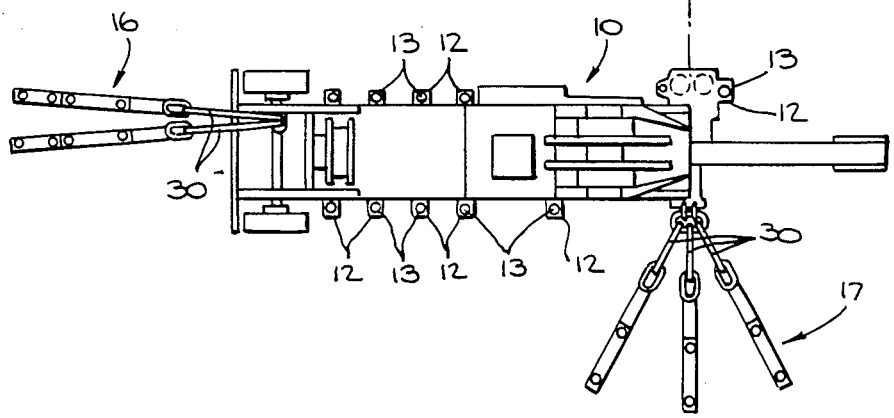

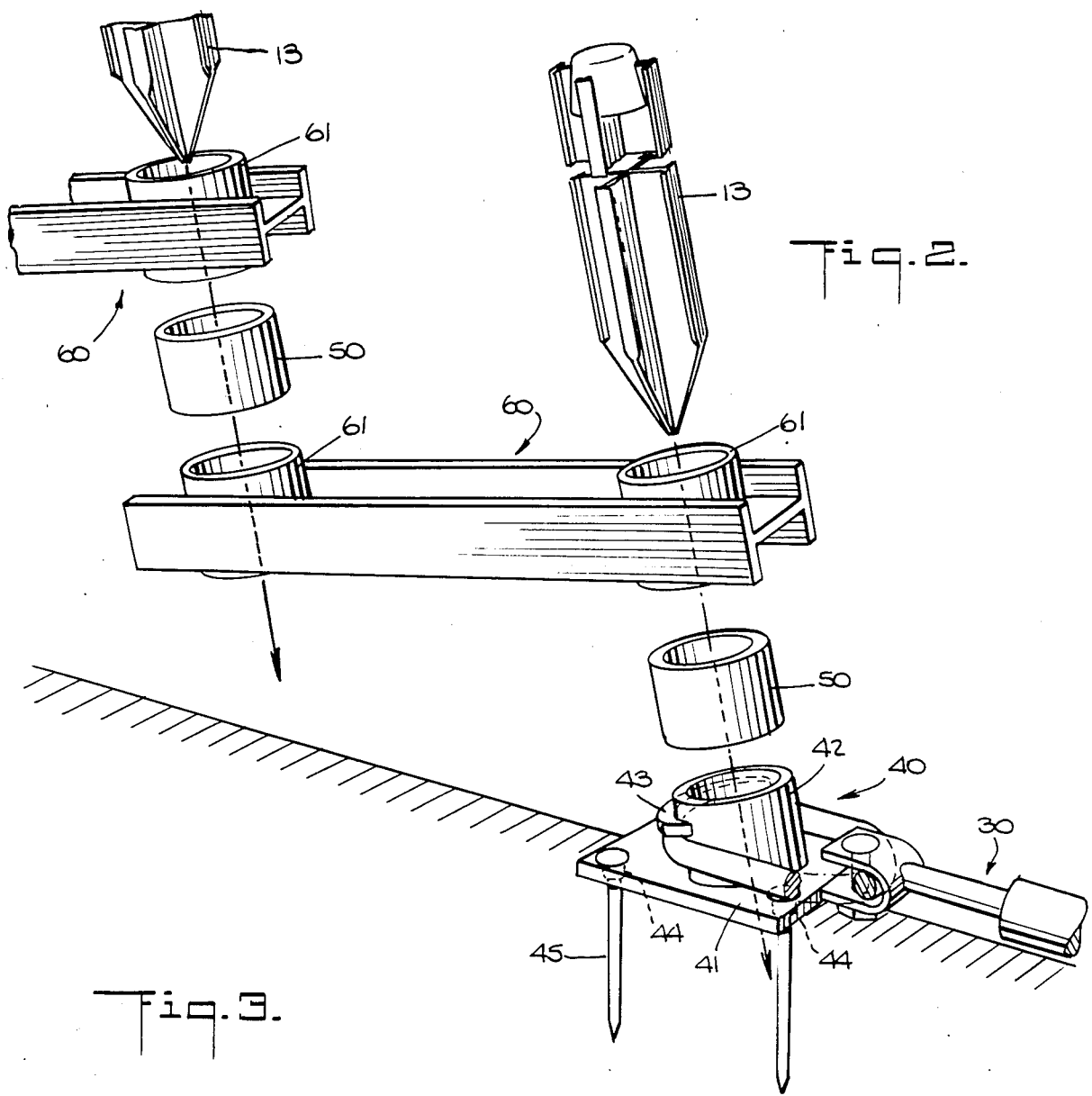
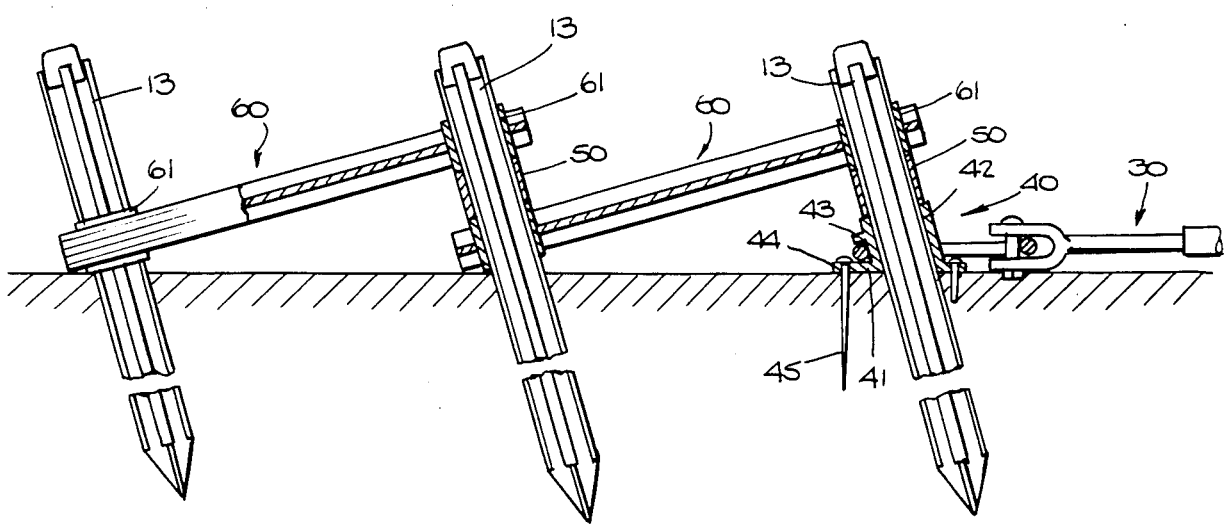

ANCHORING SYSTEM

BACKGROUND OF THE INVENTION

This invention relates to an anchoring system, and more particularly to an anchoring system for use with portable arresting gear. The invention finds particular application in portable aircraft arresting systems and will be described with reference thereto; it should be appreciated however that the invention will also find application in many systems which must be anchored to the ground during use.

Aircraft arresting systems generally include an arresting cable or net which is positioned in normal orientation to a runway and deployed so as to engage a catching device on an aircraft, or the aircraft itself, when it lands on the runway. The cable and net are connected at their opposite ends to tapes which are mounted on reels at the side of the runway. The tape and/or reels have energy absorbing and braking apparatus connected thereto. In operation, the arresting cable or net is engaged by the landing aircraft and is dragged down the runway, pulling the tape from the reels as it goes.

Portable aircraft arresting systems have been provided heretofore comprising pullable wheeled trailers carrying energy absorbers or brake units and the other equipment necessary to provide a self-contained unit for aircraft arrestment. Such portable equipment is disclosed in co-pending U.S. patent application Ser. Nos. 581,807, filed Feb. 21, 1984 and 673,607, filed Nov. 21, 1984, which are assigned to the same assignee as the present application. In connection with the use of such portable systems, two of the towable trailers are positioned on opposite sides of an airstrip with the tape ends of the units aligned transversely of the runway with a cable or net attached to the tape ends and extending across the runway. Each trailer is ground supported and in operation the trailer wheels are elevated out of contact with the ground, and the trailer appropriately secured or anchored to concrete foundations or to the ground.

The anchoring of a portable arresting system to concrete foundations is only possible when the system can be deployed on an airstrip at a position which has been previously selected and prepared with the appropriate mounting foundations. Unfortunately, under many emergency circumstances, and particularly under wartime conditions, it is not possible to know in advance where on an airstrip it will be necessary to deploy an aircraft arresting system. Under such circumstances it is imperative that there be available a ground anchoring system which can be quickly installed on whatever type of runway or ground surface might exist at the runway position best situated for making aircraft arrestments.

Heretofore ground anchoring has been achieved by means of a plurality of anchor stakes driven into the ground through mounting holes in the frame of the towable trailers and with one or more offset anchoring systems. While several of the offset anchoring systems which have been heretofore available have been generally satisfactory for this application, they have had limitations attendant to their structure which have made their proper installation relatively laborious and difficult. The present invention is directed to an improved offset anchoring system which avoids the disadvantages of the systems previously known and which offers significant advantages over such systems with respect to ease of installation and certainty of proper operation.

Typical of the offset anchoring systems used heretofore is the Befab system which is comprised of frame mounted turnbuckle rod assemblies which are connected at their opposite ends to links which are in turn connected to one or more ground anchor rods. With this system, stakes are driven into the ground at the position of the end of the anchor rods and a rod connector bolted to the top of the stakes. The ends of the ground anchor rods are threaded so that they can be bolted to the stakes at the rod connectors. Once the anchor rods are bolted to the connectors, the entire assembly is tensioned by tightening the turnbuckle and the bolts on the end of the anchor rods. It is of great importance that the ground anchor rods be equally tensioned at the point loading of a stake/rod mounting set defeats the purpose of using multiple stakes and can lead to the successive failure of all the stakes of a ground anchor. To ensure maximum holding power, great care has also been taken heretofore to drive the stakes into the ground at a defined angle of attack. This has generally required two installers as the stakes must be held while they are started into the ground at the proper angle.

SUMMARY OF THE INVENTION

The present invention provides an improved offset ground anchoring system which has great holding power and which can be installed quickly and without critical adjustments. In accordance with the present invention, a ground anchoring system is provided which eliminates the necessity in the previously known multiple anchor stake systems for connections between the stakes to be tensioned to ensure that no stake is point loaded. The invention also enables anchor stakes to be driven into the ground quickly and at the desired angle. A further feature of the invention is that the holding power of the system can be increased by adding additional stakes without adding additional lines to the article being anchored or to the anchor system already deployed. This feature of the invention makes it extremely flexible and saves time during installation as it is generally necessary for all anchor lines to be tensioned if they are to effectively increase the holding power of an anchor system.

The cited improvements in offset anchoring systems are achieved with the system of the present invention in which its tensioning member, typically a turnbuckle connected at one end to the system to be anchored, is connected at its anchor end to a stake guide which has a collar which is inclined to the plane of the ground at an angle selected for optimum stake holding power. A stake is then driven into the ground through the stake guide leaving a short length of stake above the top of the stake guide collar. A cylindrical spacer is then slid over the stake and into engagement with the stake guide collar. Next a stake tie, comprising a rigid bar having annular passages perpendicularly extending through each of its ends, is mounted on the spacer by sliding one annular passage over the top of the stake until the walls of the annular passage engage the spacer already mounted on the stake. The length of the stake tie and its incline to the plane of the ground is such that the opposite end of the stake tie engages the ground with the annular passage through the distal end of the stake tie being maintained at the same angle with respect to the ground as established by the stake guide collar. The annular passage through the distal end of the stake tie thus can serve as a second stake guide through which a stake can be driven into the ground at the same angle as the first stake. By leaving the appropriate length of the second stake extending from the ground an additional spacer and stake tie unit can be mounted thereon so as to permit the building of the anchoring system to three or more rigidly connected stakes. In the fashion described, an anchoring system can be easily assembled with each stake of the system tensioned and inclined with respect to the plane of the ground for optimum holding power.

Accordingly, a primary object of the present invention is to provide an anchoring system which can securely hold portable aircraft arresting gear against the forces imposed by aircraft arrestment.

Another object of the present invention is to provide an anchoring system utilizing multiple ground stakes for enhanced holding power which does not require tensioning of interstake connections to distribute the load to be restrained among its stakes.

Another object of the present invention is to provide an anchoring system which enables anchoring stakes to be driven into the ground at a predetermined angle to the plane of the ground with great accuracy and speed.

A further object of the present invention is to provide an anchoring system which will enable the installation of additional anchoring stakes for greater holding power without the necessity of tensioning interstake connections.

These and other objects and advantages will be apparent from the following description taken in conjunction with the accompanying drawings.

BRIEF DESCRIPTION OF THE DRAWINGS

The invention, as well as its objects and features, will be better understood by reference to the following detailed description of a preferred embodiment of this invention taken in conjunction with the accompanying drawings in which:

FIG. 1 is a plan view somewhat schematically illustrating a runway equipped with portable arresting gear which is anchored with the anchoring system according to the present invention;

FIG. 2 is an exploded sectional perspective view of one of the offset ground anchoring systems according to the present invention as depicted in FIG. 1; and FIG. 3 is a sectional elevational view of the anchoring set depicted in FIG. 2 as installed.

DETAILED DESCRIPTION OF THE INVENTION

Referring to the drawings wherein like parts are designated by the same number in all the various figures, FIG. 1 illustrates a portable aircraft arresting apparatus comprised of two towable trailers 10 having mounted thereon all of the equipment necessary to maintain pendant 11 in the proper position for aircraft arrestment, to absorb the energy of arrestment, to retract the pendant after an arrestment and to return the pendant to the proper position for the next arrestment.

The specific arrangement and construction of the towable trailers 10 is not important to the present invention and they could, for example be constructed as shown in either of the afore-referenced U.S. patent applications. The present invention is further not limited to anchoring aircraft arrestment equipment and may be used for virtually any ground anchoring application.

When trailers 10 are deployed on an airstrip they are secured to the ground by staking through side mounts 12 with stakes 13. As the holding power provided by anchoring at side mounts 12 is generally not sufficient to secure trailers 10 against the force of most arrestments, offset ground anchoring sets 14, 15, 16 and 17 are also utilized. Offset ground anchoring sets 14, 15, 16 and 17 are positioned with respect to trailers 10 so that they can best oppose the forces imposed thereon by the arrestment of aircraft A. Offset ground anchoring sets 14, 15, 16 and 17 are connected to trailers 10 with hardware which is not a part of the present invention.

Offset ground anchoring sets 14, 15, 16 and 17 are each comprised of a plurality of ground anchoring systems 20 according to the present invention. The quantity and position of the anchor sets and the number of stakes in any anchor system 20 will depend on the requirements of the application in which they are installed and should not in any way be taken to limit the present invention.

Ground anchor systems 20 are each composed of an assembly of common units which are installed in the same manner whether an anchor system 20 utilizes two or more stakes. Depicted in FIGS. 2 and 3 are sectional views of anchor system 20 which together with one or two like systems makes up each of the anchor sets 14, 15, 16 and 17.

Offset anchor system 20 is connected at the end of tensioning member 30, which may be a turnbuckle, with weldless link 31. Stake guide 40 is composed of a base 41 having mounted thereon a sleeve 42, the base engaging edge of which is cut laterally to the longitudinal axis of the sleeve so that it engages base 41 at an angle from the normal line to the base. The angle defined by the incline of sleeve 42 is selected to impart to a stake which is driven through sleeve 42, a desirable mix of holding power and ease of insertion into the earth using power tools. This angle is normally in the range of 5°–30° from the normal line and preferably will be 15° from the normal line. Sleeve 42 is equipped with a ledge 43 which prevents weldless link 31 from sliding off stake guide 40. Sleeve 42 is sized to enable the close passage of anchor stake 13 through its center. Stake guide 40 is also equipped with a plurality of anchoring holes 44 through which one or more nails 45 can be driven to hold stake guide 40 in place while stake 13 is driven therethrough.

After stake guide 40 is connected to tensioning member 30 with weldless link 31 and nailed to the desired ground position with nail 45, stake 13 is driven into the ground until only a short length of stake 13 extends from sleeve 42. Spacer collar 50, a hollow cylinder, is then slid over the top of stake 13 and pushed into engagement with the top edge of stake guide sleeve 42. To position and connect a second stake to anchor system 20, stake tie 60 is used. Stake tie 60 is comprised of an I-beam having cylindrical passages 61 extending perpendicularly through its central plane a small distance from each of its ends. Cylindrical passages 61 extend a small distance above and below the parallel sides of the I-beam and are sized to permit the close passage of stake 13 therethrough. Stake tie 60 is installed by sliding the cylindrical passage 61 at one end of the stake tie over stake 13 until it engages spacer collar 50. The length of stake tie 60 is such that its distal end engages the ground with the axis of its cylindrical passage 61 at that end being disposed with respect to the ground at the same angle as is established by stake guide sleeve 42. Accordingly, with stake tie 60 so installed, it can be adjusted to be directly in line with the first installed stake and with tensioning member 30, and a second stake 13 driven into the ground through cylindrical passage 61 at its distal end. In the foregoing fashion, a two stake system is established wherein the two stakes must be rigidly connected and installed at the same angle with respect to the plane of the ground.

In another embodiment of the invention, spacer collars 50 are integral with cylindrical passages 61 in stake tie 60. In this embodiment, a spacer collar 50 is affixed to the bottom side of the passage 61 on stake tie 60 which is at the stake proximate end of the tie 60 and a second collar 50 is affixed to the top side of the passage 61 at the distal end of stake tie 61. With this embodiment of the invention, care must be taken that stake ties 60 are installed with their integral spacer collars properly oriented with respect to the other elements of the system.

It should be readily appreciated that if the application requires additional anchoring strength, it can be provided by installing a second spacer collar 50 and stake tie 60 over the second stake 13 in the system and then a third stake through the cylindrical passage 61 at the distal end of the second stake tie 61 in the same fashion as described with respect to the second stake 13. It should also be appreciated that the same procedure can be followed to add any number of additional stakes to anchor system 20.

Once offset anchoring system 20 is assembled as aforedescribed, tensioning member 30 is adjusted to ensure that towable trailer 10 is securely held thereto. As will be apparent from the foregoing description, with the present invention there is no need to tension any interstake connections as the structure of the present system is such that proper load distribution between the stakes is assured.

The installation of the aircraft arresting system depicted in FIG. 2 is completed by installing additional anchoring systems at the desired locations using the procedure described above. The system can be readily adapted to a diversity of field conditions by extending tensioning members 30, or by utilizing in combination two or more shorter tensioning members, to avoid terrain where it would be difficult or impossible to drive stakes.

In most applications the component parts of offset anchoring system 20 will be composed of steel or some other strong material, but in light duty applications they may be made out of some plastics or other less strong materials.

It will be apparent to those skilled in the art that changes and other modifications may be made to the apparatus shown and described herein without departing from the scope of the appended claims.

What is claimed is:

1. A multiple stake ground anchoring system comprising:
   a stake guide having a base section and an elongated hollow sleeve section which is inclined to the base section and which extends therethrough;
   a first stake extending through said hollow sleeve of the stake guide;
   a hollow spacer collar mounted on said sleeve section of the stake guide and in coaxial alignment therewith, said spacer collar being sized to permit the passage of said stake closely through its hollow interior;
   a rigid elongated stake tie having two passages extending through it, said passages having parallel axes and being sized to permit the passage of said stake closely therethrough, said stake tie being mounted on said spacer collar with one of its passages in coaxial alignment with said hollow spacer collar; and
   a second stake extending through the passage in said stake tie which is distal to that mounted on said spacer collar, whereby said second stake is rigidly connected to said first stake and both said stakes are at the same angle of inclination with respect to the base section of said stake guide.

2. The multiple anchoring system according to claim 1 wherein:
   a second spacer collar is mounted on the distal passage through said stake tie and is in coaxial alignment therewith;
   a second stake tie is mounted on said second spacer collar with one of its passages in coaxial alignment with said second spacer collar; and
   a third stake extending through the passage in said second stake tie which is distal to that mounted on said second spacer collar whereby said third stake is rigidly connected to said second stake and both of said stakes are at the same angle of inclination with respect to the base section of said stake guide.

3. The multiple stake ground anchoring system according to claim 1 further including a tensioning means removably connected at one end to said anchoring system at the position of said first stake and at its other end to the article to be anchored.

4. The multiple stake ground anchoring system according to claim 2 further including a tensioning means removably connected at one end to said anchoring system at the position of said first stake and at its other end to the article to be anchored.

5. The multiple stake ground anchoring system according to claim 3 wherein said tensioning means is connected to said anchoring system with a link which surrounds said stake guide sleeve and said stake guide sleeve is provided with a ledge spaced from the base section of said stake guide whereby said link is prevented from sliding off said stake guide sleeve when it is positioned between said ledge and the base section of the stake guide.

6. The multiple stake ground anchoring system according to claim 1 wherein said rigid elongated stake tie is comprised of an I-beam.

7. The multiple stake ground anchoring system according to claim 6 wherein the passages through said stake tie are comprised of hollow cylindrical projections extending upwardly and downwardly from the central member of said I-beam.

* * * * *